United States Patent [19]

Hashimoto

[11] Patent Number: 4,907,275
[45] Date of Patent: Mar. 6, 1990

[54] ENCRYPTION APPARATUS

[75] Inventor: Noriaki Hashimoto, Hadano, Japan

[73] Assignee: Hitachi, Ltd., Tokyo, Japan

[21] Appl. No.: 195,516

[22] Filed: May 18, 1988

[30] Foreign Application Priority Data

May 20, 1987 [JP] Japan ................................ 62-123021

[51] Int. Cl.⁴ .......................... H04L 9/02; H04K 1/04
[52] U.S. Cl. ........................................ 380/50; 380/33; 380/37
[58] Field of Search ....................... 380/49, 50, 37, 33, 380/29, 48

[56] References Cited

U.S. PATENT DOCUMENTS

| | | | |
|---|---|---|---|
| 4,078,132 | 3/1978 | Tuckerman, III | 380/49 |
| 4,160,120 | 7/1979 | Barnes et al. | 380/49 |
| 4,249,180 | 2/1981 | Eberle et al. | 380/49 |
| 4,368,357 | 1/1983 | Gurak | 380/33 |

OTHER PUBLICATIONS

"Information Processing" vol. 25, No. 6 (1984), pp. 561–565.

Primary Examiner—Thomas H. Tarcza
Assistant Examiner—Linda J. Wallace
Attorney, Agent, or Firm—Antonelli, Terry & Wands

[57] ABSTRACT

In an encryption apparatus, prior to encryption process, information indicating whether plain text blocks are to be encrypted or not is stored in a mask register, and the number of blocks of the plain text block sequence is stored in a count register. In the encryption process, the count register is sequentially decremented, and only the plain text blocks to be encrypted are read from an input buffer in an ascending order of addresses based on the information stored in the mask register. They are encrypted by an encryption circuit and the encrypted text blocks are stored in an output buffer at the corresponding addresses to the input buffer addresses at which the plain text blocks have been stored. After the encryption process for the plain text blocks to be encrypted, only the plain text blocks not to be encrypted are sequentially read from the input buffer in the ascending order of the addresses and they are stored, without being encrypted, in the output buffer at the corresponding addresses to the input buffer addresses at which the plain text blocks have been stored.

6 Claims, 8 Drawing Sheets

FIG. 3
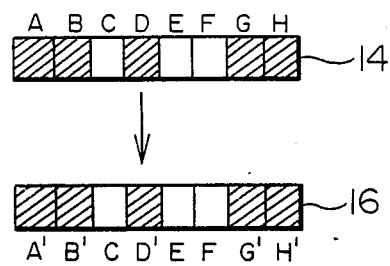
FIG. 4A
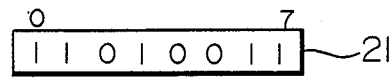
FIG. 4B
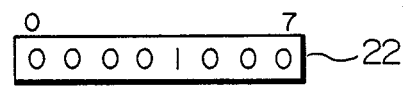
FIG. 5A
| STEP | INPUT BUFFER ADDRESS (HEX) | DATA |
|---|---|---|
| 1 | 00 | A |
| 2 | 08 | B |
| 3 | 18 | D |
| 4 | 30 | G |
| 5 | 38 | H |
| 6 | 10 | C |
| 7 | 20 | E |
| 8 | 28 | F |
FIG. 5B
| STEP | OUTPUT BUFFER ADDRESS (HEX) | DATA |
|---|---|---|
| 1 | 00 | A' |
| 2 | 08 | B' |
| 3 | 18 | D' |
| 4 | 30 | G' |
| 5 | 38 | H' |
| 6 | 10 | C |
| 7 | 20 | E |
| 8 | 28 | F |

FIG. 7

| STEP | COUNT REGISTER | INPUT DATA REGISTER | OUTPUT DATA REGISTER |
|---|---|---|---|
| 1 | 8 | A | A' |
| 2 | 7 | B | B' |
| 3 | 6 | D | D' |
| 4 | 5 | G | G' |
| 5 | 4 | H | H' |
| 6 | 3 | C | C |
| 7 | 2 | E | E |
| 8 | 1 | F | F |

FIG. 8A

| STEP | INPUT BUFFER ADDRESS (HEX) | DATA |
|---|---|---|
| 1 | 0 0 | A |
| 2 | 0 8 | B |
| 3 | 1 0 | C |
| 4 | 1 8 | D |
| 5 | 2 0 | E |
| 6 | 2 8 | F |
| 7 | 3 0 | G |
| 8 | 3 8 | H |

FIG. 8B

| STEP | OUTPUT BUFFER ADDRESS (HEX) | DATA |
|---|---|---|
| 1 | 0 0 | A' |
| 2 | 0 8 | B' |
| 3 | 1 0 | C |
| 4 | 1 8 | D' |
| 5 | 2 0 | E |
| 6 | 2 8 | F |
| 7 | 3 0 | G' |
| 8 | 3 8 | H' |

FIG. 10

| STEP | COUNT REGISTER | INPUT DATA REGISTER | OUTPUT DATA REGISTER |
|------|----------------|---------------------|----------------------|
| 1 | 8 | A | A' |
| 2 | 7 | B | B' |
| 3 | 6 | C | C |
| 4 | 5 | D | D' |
| 5 | 4 | E | E |
| 6 | 3 | F | F |
| 7 | 2 | G | G' |
| 8 | 1 | H | H' |

…

ENCRYPTION APPARATUS

BACKGROUND OF THE INVENTION

The present invention relates to an encryption apparatus, and more particularly to an encryption apparatus suitable for high speed encryption when encryption is introduced into a computer system.

A DES (data encryption standard) system established by the U.S. Department of Commerce, Standard Office in 1977 has been known. Prior art encryption processing is described in "Information Processing" Vol. 25, No. 6 (1984) pages 561–565.

In the DES system, 64-bit (8-byte) plain text block data is encypted by 64-bit (8-byte) key data. Thus, the DES system is block encryption which processes data to be encrypted as 64-bit (8-byte) block.

In order to implement the DES system by a hardware, it is necessary to select one of encryption utilization modes in accordance with a purpose of use. Usually, a plain text includes many repetitions of the same bit pattern. If it is encrypted by one algorithm and one key data, the encrypted sentence includes repetitive patterns. There is a risk of decryption if the encrypted text is statistically analyzed and hence it is not desirable from security standpoint.

A CBC (cipher block chaining) mode is known as a high security mode because it generates different encrypted texts even if the same plain text and key data are repeatedly used for encryption.

An outline of the operation of the CBC mode is explained with reference to FIG. 11. In a step 1, an 8-byte plain text block loaded in an input data register 1 and an 8-byte initial vector loaded in an initial vector register 2 are supplied to a logic circuit 3 to exclusively-OR them, and resulting data is encrypted by an encryption circuit 4 to produce an encrypted text block, which is loaded to an output data register 5. In a step 2, the encrypted text block is fed back to an input and supplied to the logic circuit 3 where it is exclusively ORed with the next 8-byte plain text block of the input data register 1, and the resulting data is encrypted by the encryption circuit 4 and the output of the encrypted text block is loaded to the output data register 5. Similar encryption process is repeated until a step N so that the plain text block data sequence consisting of N 8-byte blocks is encrypted.

In FIG. 11, key data is omitted. While circuits for the steps 2, . . . - N are separately shown for easiness of explanation, the circuit used in the step 1 is actually used for the steps 2, . . . - N. In the decoding process, a circuit used in the decryption process (enclosed by broken lines in FIG. 11) is used as it is. In the decoding process, the encrypted text blocks are sequentially loaded to the input data register and the plain text blocks are sequentially outputted. Other operations are identical to those of the decryption process.

SUMMARY OF THE INVENTION

When data on a communication line or file data in a magnetic disk pack is to be encrypted, there is usually a portion of data (for example, "0" bit sequence) which is not effective for encryption. In the prior art, since the entire plain text block which is the input data is encrypted, a portion which should not be encrypted or a portion which is not effective for encryption is equally encrypted. As a result, overhead of the preencryption process increases and effective encryption performance is lowered.

It is an object of the present invention to provide an encryption system which outputs input data (plain text) as it is for a portion which is not a subject of encryption, and encrypts only a portion which is the subject of encryption.

It is another object of the present invention to provide an encryption system which assures a sequence of an encrypted text block corresponding to a sequence of a plain text block, as viewed from a host unit of the encryption apparatus when only a portion of the plain text which is the subject of encryption is encrypted.

Those objects are achieved by providing a mask register for setting information indicating whether plain text blocks in an input buffer are subjects to be encrypted or subjects not to be encrypted, for each plain text block, and a read/write control circuit which, based on the information of the mask register, sequentially reads the plain text blocks to be encrypted from the input buffer, supplies them to an encryption processor, stores the encrypted text blocks encrypted by the encryption processor to predetermined positions (the same positions as those of the input buffer at which the plain text blocks were stored) of an output buffer, sequentially reads the plain text blocks not to be encrypted from the input buffer, and stores them at predetermined positions of the output buffer without supplying them to the encryption processor.

BRIEF DESCRIPTION OF THE DRAWINGS

FIG. 3 shows an embodiment of encryption process of the present invention, FIGS. 4A and 4B show data of a mask register and a count register of FIG. 1, FIGS. 5A and 5B show operations of an input buffer read circuit and an output buffer write circuit of FIG. 1, FIG. 7 shows a relationship among the count register, input data register and output register in the operations in accordance with FIGS. 5A and 5B, FIGS. 8A and 8B show other operations of the input buffer read circuit and the output buffer write circuit of FIG. 1, FIG. 10 shows a relationship between the count register, input data register and output data register in the operations in accordance with FIGS. 8A and 8B.

DESCRIPTION OF THE PREFERRED EMBODIMENTS

One embodiment of the present invention is explained with reference to the drawings.

Figure 2A:
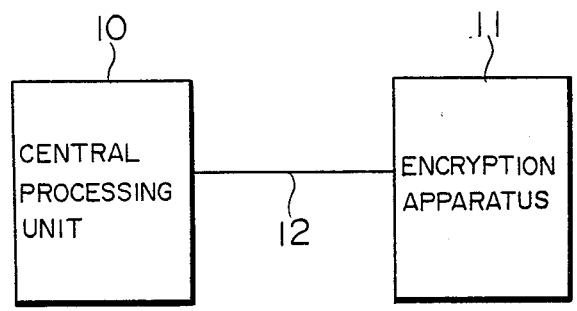
FIG. 2A shows a schematic configuration of a computer system which is an object of the present invention.

FIG. 2A shows a block diagram of a computer system which is a object of the present invention. In FIG. 2A, a central processing unit 10 and an encryption apparatus 11 are interconnected through a channel path 12.

Figure 2B:
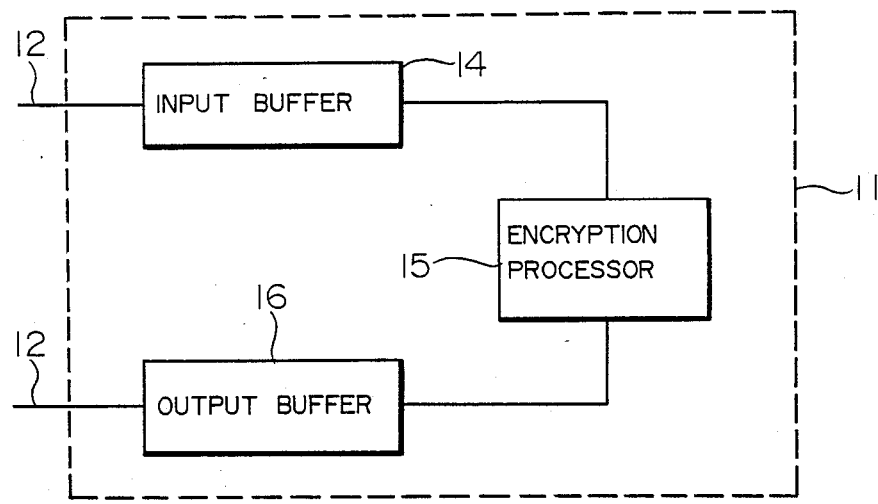
FIG. 2B shows an encryption apparatus of FIG. 2A.

As shown in FIG. 2B, the encryption apparatus 11 comprises an input buffer 14, an encryption processor 15 and an output buffer 16, and the input buffer 14 and the output buffer 16 are connected to the central processing unit 10 through the channel path 12. The encryption apparatus 11 stores a plain text block sequence sent from the central processing unit 10 through the channel path 12 into the input buffer 14. The encryption processor 15 encrypts the plain text block sequence of the input buffer 14 one block at a time and stores it into the output buffer 16. When the encrypted block sequence has been stored into the output buffer 16, the encryption apparatus 11 sends it back to the central processing unit 10 through the channel path 12. The present invention relates to the encryption processor 15.

Figure 1:
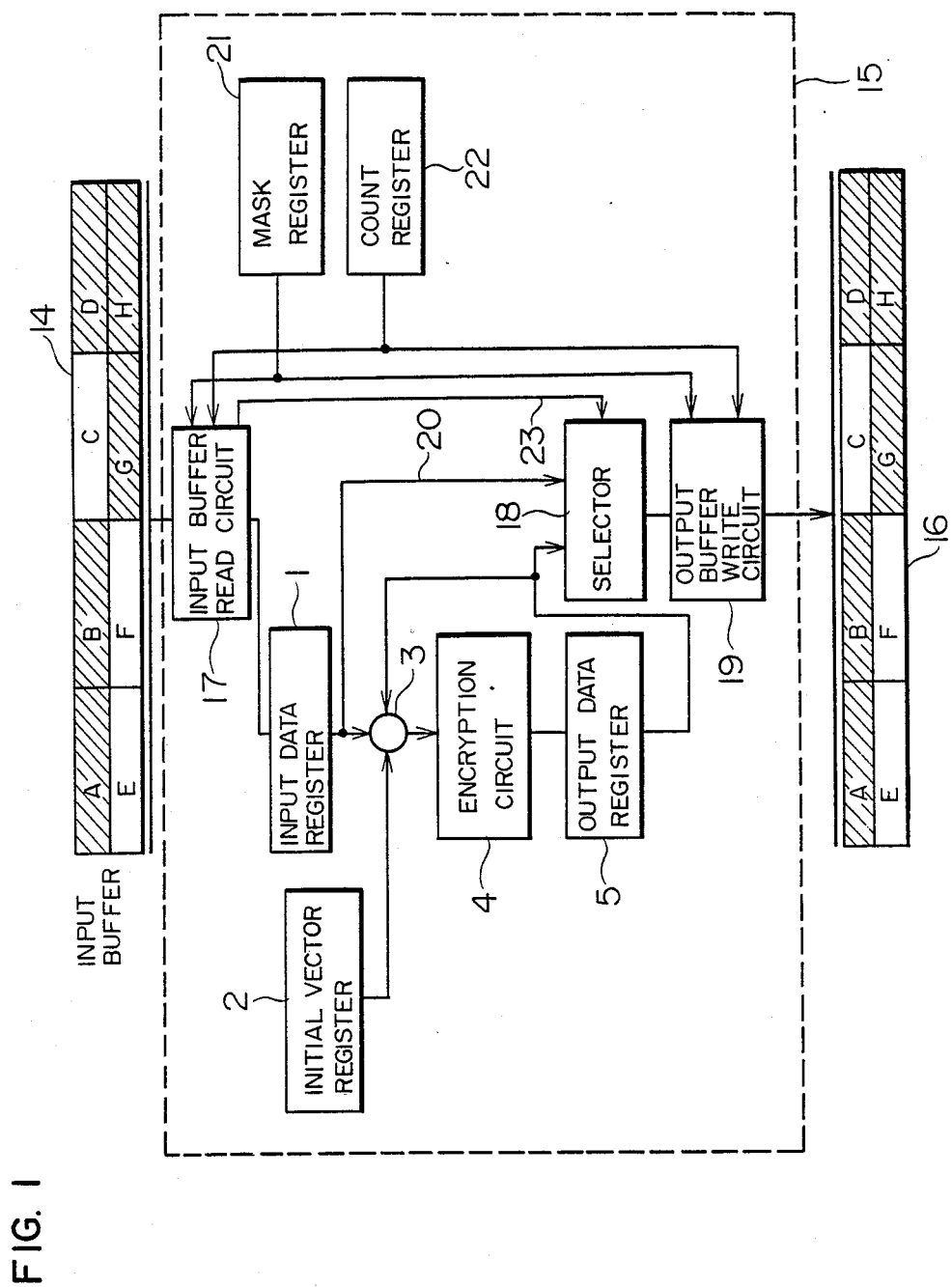
FIG. 1 shows a configuration of one embodiment of an encryption apparatus of the present invention.

FIG. 1 shows a detail of an embodiment of the encryption processor 15 which is a heart of the present invention. In order to simplify the description, it is assumed that the input buffer 14 and the output buffer 16 are of 64-byte capacity in which eight 8-byte blocks of plain text sequence and encrypted text sequence are stored, respectively. Of the eight blocks A-H of the plain text block sequence, objects to be encrypted are hatched blocks A, B, D, G and H, which are encrypted to blocks A', B', D', G' and H' to produce encrypted text block sequence A', B', C, D', E, F, G' and H' corresponding to the plain text block sequence A, B, C, D, E, F, G and H. FIG. 3 shows a relationship between the plain text block sequence and the encrypted text block sequence.

Figure 11:
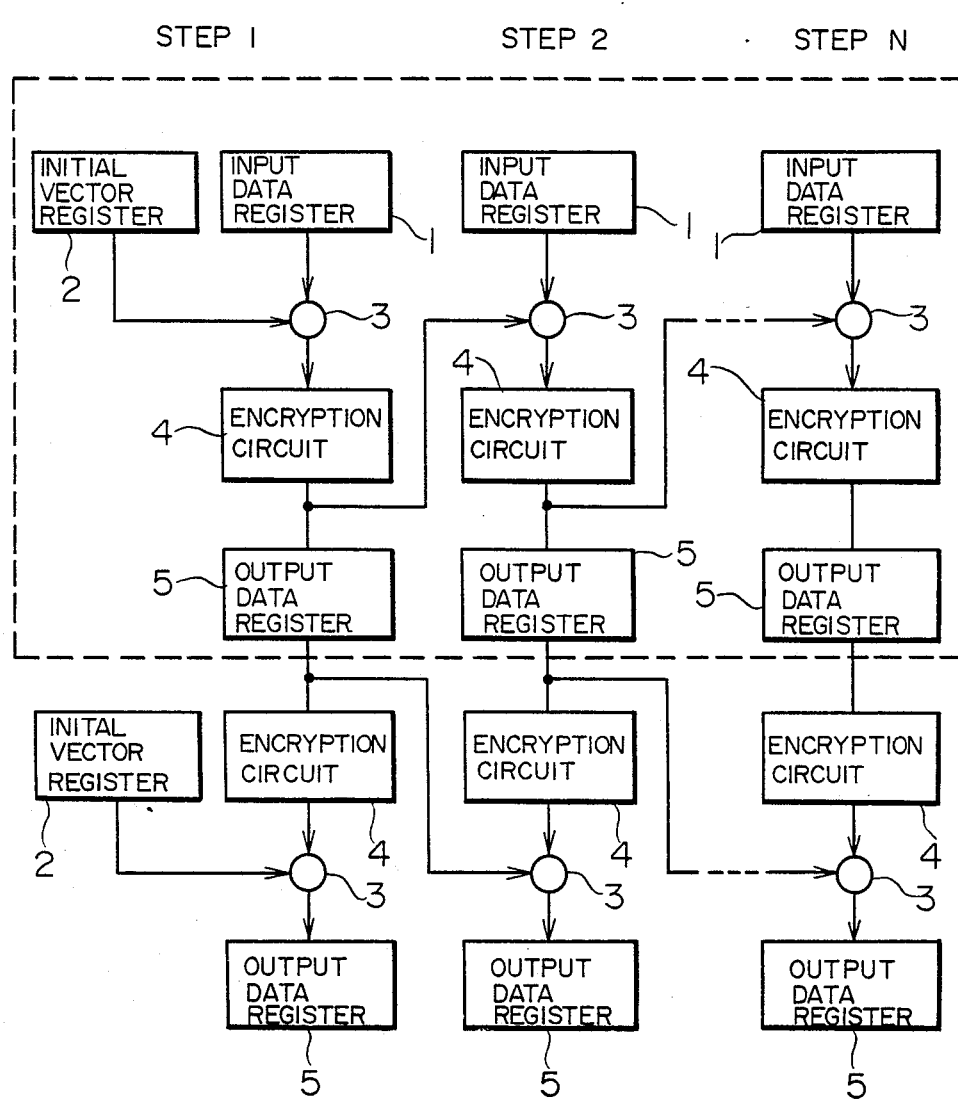
FIG. 11 shows a prior art configuration.

In FIG. 1, an input data register 1 is one in which one 8-byte plain text block is set, and an initial vector register 2 is one in which an 8-byte initial vector is set. A logic circuit 3 exclusive-ORs the 8-byte plain text block in the register 1 with the 8-byte initial vector in the register 2. An encryption circuit 4 encrypts one 8-byte block at a time and an output data register 5 is one in which an 8-byte encrypted text block is set. The elements 1-5 correspond to the element 1-5 of FIG. 11.

A mask register 21 has eight bits in which information indicating a block to be encrypted out of the eight plain text blocks stored in the input buffer 14. In the present embodiment, of the eight plain text blocks stored in the input buffer 14, the blocks to be encrypted are A, B, D, G and H. As shown in FIG. 4A, a code (D3)$_{HEX}$ is set in the mask register 21. The bits 0-7 of the mask register 21 correspond to the eight plain text blocks A-H. The bits corresponding to the blocks to be encrypted are set to "1" and the bits corresponding to the blocks not to be encrypted are set to "0". A count register 22 counts the number of plain text blocks to be processed. Initially, a block length of the plain text block sequence stored in the input buffer 14 is registered therein. In the present embodiment, (08)$_{HEX}$ is set as shown in FIG. 4B since the plain text block sequence comprises eight blocks.

An input buffer read circuit 17 reads the plain text from the input buffer 14 one block at a time. The plain text blocks are sequentially set into the input data register 1. Specifically, the input buffer read circuit 17 generates an address of the input buffer 14 in the sequence of steps shown in FIG. 5A based on the information stored in the mask register 21 to read target data. FIG. 5A shows that the plain text blocks A, B, D, G and H which are to be encrypted are read in steps 1-5, and the plain text blocks C, E and F not to be encrypted are read in steps 6-8. The input buffer read circuit 17 decrements the count register 22 by one each time it reads one plain text block from the input buffer 14 and sets it to the input register 1.

Figure 6:
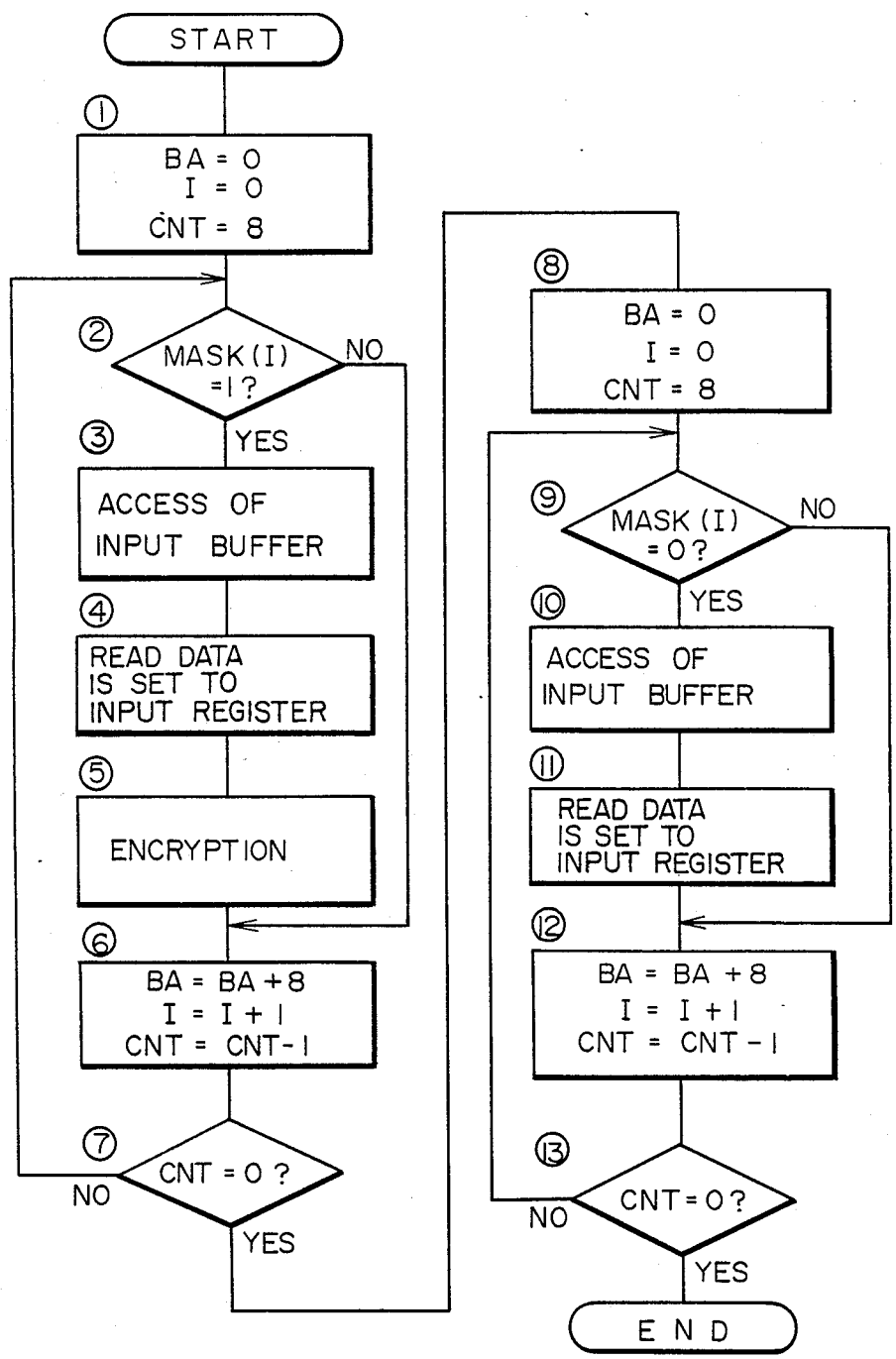
FIG. 6 shows a flow chart of an operation of the input buffer read circuit of FIG. 1 in accordance with FIGS. 5A and 5B.

FIG. 6 shows a process flow of the input buffer read circuit 17. Symbols shown in FIG. 6 are defined as follows.

BA: An 8-bit buffer address register in the input buffer read circuit 17. A read address of the input buffer is set therein.

I: It indicates a bit position of the mask register 21. I=0-7.

CNT: The 8-bit count register 22. A content thereof indicates a block length of the plain text block sequence.

MSK(I): It indicates a bit position I of the mask register 21. It is either "0" or "1".

In steps   -  , the plain text blocks corresponding to bits "1" of the mask register 21 are read from the input buffer 14 and set to the input data register 1. In steps   -  , the plain text blocks corresponding to bits "0" of the mask register 21 are read from the input buffer 14 and set to the input data register 1. In the steps     and   , the registers BA, I and CNT are cleared zero, and in the step     the encryption circuit 4 encrypts the blocks.

A selector 18 of FIG. 1 selects either the plain text blocks of the input data register 1 or the encrypted text blocks of the output data register 5. The selection is controlled by a control line 23 from the input buffer read circuit 17. The input buffer read circuit 17 instructs to the selector 18 to select the output data register 5 while the plain text blocks corresponding to the bits "1" of the mask register 21 are read from the input buffer 14 and set to the input data register 1 (during the steps   -   of FIG. 6), and instructs to select the input register 1 while the plain text blocks corresponding to the bits "0" of the mask register 21 are read from the input buffer 14 and set to the input data register 1 (during the steps   -   of FIG. 6).

An output buffer write circuit 19 writes the encrypted text block or the plain text block at the output of the selector 18 to the output buffer 16. The address control of the output buffer 16 is basically identical to that of the input buffer read circuit 17 except for a time delay. FIG. 5B shows a relationship between the address of the output buffer 16 generated by the output buffer write circuit 19 and the write data.

The operation in the steps of FIG. 1 is explained with reference to FIGS. 5A and 5B. FIG. 7 shows a relationship among the count register 22, the input data register 1 and the output data register 5 in each step.

Step 1

Under the control of the input buffer read circuit 17, the plain text block A is read from the address (00)$_{HEX}$ of the input buffer 14 and it is set in the input data register 1. The plain text block A is then exclusive-ORed with the initial vector stored in the initial vector register 2 by the logic circuit 3, and the resulting data is encrypted by the encryption circuit 4, which produces an encrypted text block A', which is stored at the address (00)$_{HEX}$ of the output buffer 16 through the output data register 5, selector 18 and output buffer write circuit 19.

Step 2

The plain text block B is read from the address (08)$_{HEX}$ of the input buffer 14 by the input buffer read circuit 17 and it is set to the input data register 1. Then, the plain text data block B is exclusive-ORed with the encrypted text block A' stored in the output data register 5 in the step 1, by the logic circuit 3 and the resulting data is supplied to the encryption circuit 4 which produces an encryption text block B', which is set to the output register 5. The encryption text block B' stored in the output register 5 is stored at the address (08)HEX of the output register 16 through the selector 18 and the output buffer write circuit 19.

Step 3

The plain text block D is read from the address (18)$_{HEX}$ of the input buffer 14 and it is exclusive-ORed with the encrypted text block B' produced in the step 2. Then, an encrypted text block D' is stored at the address (18)$_{HEX}$ of the output buffer 16 in the same manner as the step 2.

Step 4

The plain text block G is read from the address (30)$_{HEX}$ of the input buffer 14 and it is exclusive-ORed with the encrypted text block D' produced in the step 3. Then, an encrypted text block G' is stored at the address (30)$_{HEX}$ of the output buffer 16 in the same manner as the step 2.

Step 5

The plain text block H is read from the address (38)$_{HEX}$ of the input buffer 14 and it is exclusive-ORed with the encrypted text block G' produced in the step 4. Then, an encrypted text block H' is stored at the address (38)$_{HEX}$ of the output buffer 16 in the same manner as the step 2.

Step 6

By the function of the input buffer read circuit 17, the plain text block C is read from the address (10)$_{HEX}$ of the input buffer 14 and set to the input data register 1. The content of the input data register 1 is sent out to the bypass line or lines 20. The selector 18 now selects the bypass line. Accordingly, the plain text block C is stored at the address (10)$_{HEX}$ of the output buffer 16 by the output buffer write circuit 19 without being encrypted.

Step 7

The plain text block E is read from the address (20)$_{HEX}$ of the input buffer 14 and it is stored at the address (20)$_{HEX}$ of the output buffer 16 without being encrypted, in the same manner as the step 6.

Step 8

The plain text block F is read from the address 28)$_{HEX}$ of the input buffer 14, and it is stored at the address (28)$_{HEX}$ of the output buffer 16 without being encrypted, in the same manner as the step 6.

In the present embodiment, the plain text blocks to be encrypted and the plain text blocks not to be encrypted are processed in group. In a second operation mode (shown in FIGS. 8, 9 and 10), the plain text blocks are sequentially processed in the order of storage in the input buffer. In the second operation mode, addresses are generated in the order of storage in the input buffer and target data is read. As shown in FIG. 8A, the plain text blocks A-H are read in the steps 1-8.

Figure 9:
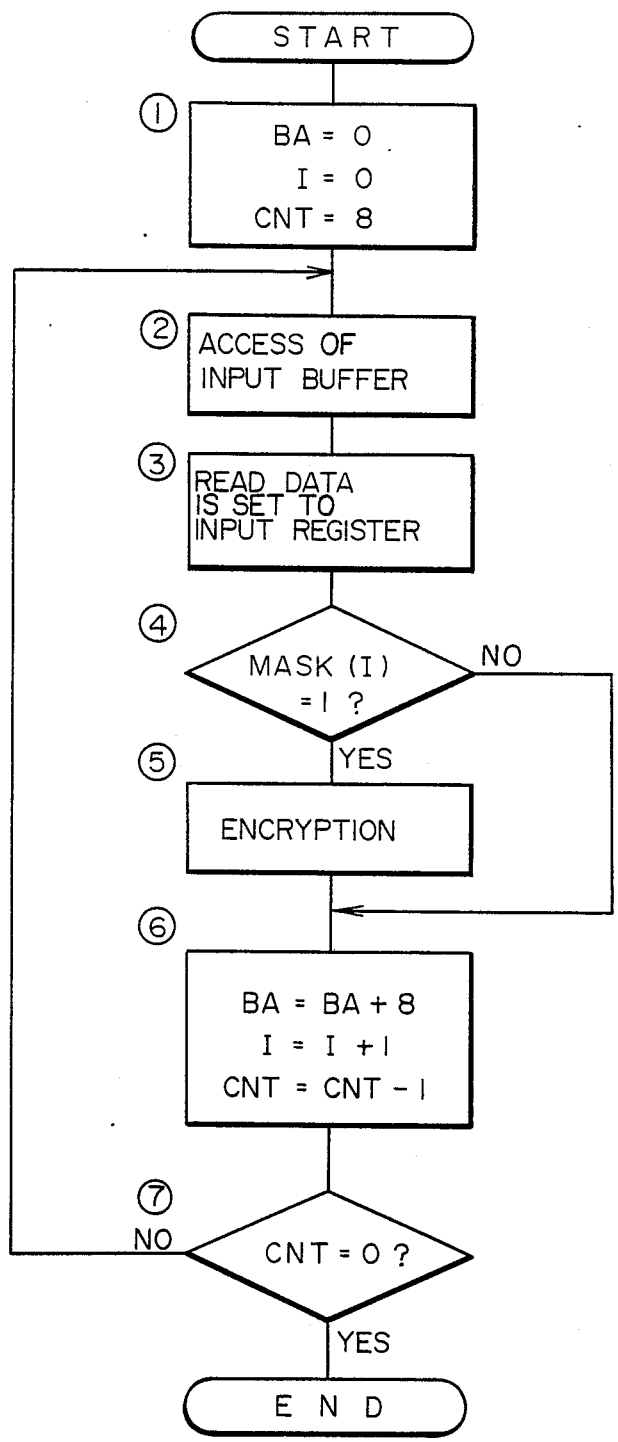
FIG. 9 shows a flow chart of the operations of the input buffer read circuit of FIG. 1 in accordance with FIGS. 8A and 8B.

FIG. 9 shows a process flow of the second operation mode. BA, I, CNT and MSK(I) are identical to those shown in FIG. 6, and the circuit configuration of FIG. 1 remains unchanged.

The second operation mode is explained for each step with reference to FIGS. 1, 8A and 8B. FIG. 10 shows a relationship among the count register 22, input data register 1 and output data register 5, for each step.

Step 1

Under the control of the input buffer read circuit 17, the plain text block A is read from the address (00)$_{HEX}$ of the input buffer 14 and it is set to the input data register 1. Then, whether the plain text block stored in the input data register 1 is to be encrypted or not is determined. Namely, whether the MASK(I) is "1" or "0" is determined. Since the plain text block A is to be encrypted, it is encrypted. The plain text block A is exclusive-ORed with the initial vector stored in the initial vector register 2 by the logic circuit 3, and the resulting data is encrypted by the encryption circuit 4 which produces an encrypted block A', which is stored at the address (00)$_{HEX}$ of the output buffer 16 through the output data register 5, selector 18 and output buffer write circuit 19. The encrypted text block A' stored in the output register 5 is held as it is.

Step 2

The plain text block B is read from the address (08)$_{HEX}$ of the input buffer 14 by the input buffer read circuit 17 and it is set to the input register 1. Then, whether the plain text block stored in the input register 1 is to be encrypted or not is determined. Namely, whether MASK(I) is "1" or "0" is determined. Since MASK(I) is now "1", the plain text block B is encrypted.

The plain text block B is exclusive-ORed with the encrypted text block A' stored in the output data register 5 in the step 1, by the logic circuit 3, and the resulting data is supplied to the encryption circuit 4 which produces an encrypted text block B', which is set to the output register 5. The encrypted text block B' stored in the output register 5 is then stored at the address (08)$_{HEX}$ of the output buffer 16 through the selector 18 and the output buffer write circuit 19. The encrypted text block B' stored in the output register 5 is held as it is.

Step 3

By the function of the input buffer read circuit 17, the plain text block C is read from the address (10)$_{HEX}$ of the input buffer 14 and it is set to the input data register 1. Then, whether the plain text block stored in the input register 1 is to be encrypted or not is determined. Namely, whether MASK(I) is "1" or "0" is determined. Since the plain text block C is now not to be encrypted, MASK(I) is not "1" and the plain text block C is not encrypted. The content of the input register is sent out to the bypass line 20, and the selector 18 selects the bypass line. Accordingly, the encrypted text block C is stored at the address (10)$_{HEX}$ of the output buffer 16 by the output buffer write circuit 19 without being encrypted. During the step 3, the encrypted text block B' produced in the step 2 is held in the output register 5.

Step 4

The plain text block D is read from the address (18)$_{HEX}$ of the input buffer 14 and it is encrypted in the same flow as that of the steps 1 and 2. The data to be exclusive-ORed with the plain text block D is the encrypted text block B' which was produced in the step 2 and held in the output data register 5. The resulting encrypted text block D' is stored at the address (18)$_{HEX}$ of the output buffer 16. The encrypted text block D' stored in the output register 5 is held as it is.

Step 5

The plain text block E is read from the address (20)$_{HEX}$ of the input buffer 14 and it is stored at the address 20)$_{HEX}$ of the output buffer without being encrypted, in the same manner as the step 3.

Step 6

The plain text block F is read from the address (28)$_{HEX}$ of the input buffer 14 and it is stored at the address (28)$_{HEX}$ of the output buffer 16 without being encrypted, in the same manner as the step 3.

Step 7

The plain text block G is read from the address (30)$_{HEX}$ of the input buffer 14 and it is exclusive-ORed with the encrypted text block D' produced in the step 4. Then, the encrypted text block G' is stored at the address (30)$_{HEX}$ of the output buffer 16 in the same manner as the step 4.

Step 8

The plain text block H is read from the address (38)$_{HEX}$ of the input buffer 14 and it is exclusive-ORed with the encrypted text block G' produced in the step 7. Then, the encrypted text block H' is stored at the address (38)$_{HEX}$ of the output buffer in the same manner as the step 2.

In the description of the embodiments for the two operation modes of the present invention, only the encryption process of the encryption apparatus is discussed and decryption process is not discussed although the present invention is also applicable to the decryption process. In FIG. 1, the sequence of the plain text blocks stored in the input buffer 14 is rearranged in the encryption process, and it is again rearranged to the original sequence when the encrypted result is stored in the output buffer 16. Accordingly, the same circuit as that used in the encryption process may be used in the decryption process.

In the embodiment of the present invention, the CBC utilization mode is explained although the present invention is also applicable to an ECB utilization mode or other feedback type block encryption utilization mode.

By using the block length of the plain text block as the initial vector stored in the initial vector register 2, the initial vector register 2 may be shared with the counter register 22.

In accordance with the present invention, the plain text blocks to be encrypted are supplied to the encryption circuit but the plain text blocks not to be encrypted are not sent to the encryption circuit but bypassed directly to the output of the encryption circuit. Accordingly, the encryption processing time for the plain text blocks not to be encrypted is saved and the encryption performance is enhanced. Even if the sequence of the blocks of the predetermined length plain text block sequence stored in the input buffer is different from the sequence of encryption process, the sequence of the plain text block and the sequence of the encrypted text blocks, as viewed from the host unit, are assured because the encrypted text blocks which are output data of the encryption process are stored in the output buffer in the sequence corresponding to that of the plain text blocks stored in the input buffer.

In accordance with the present invention, the blocks to be encrypted and the blocks not to be encrypted may be designated for the predetermined length plain text block sequence so that the former are encrypted to produce the encrypted blocks and the latter are not encrypted and outputted in the form of plain text blocks. Accordingly, the encryption process time is shortened and the performance of the encryption apparatus is enhanced.

When the present invention is used for the feedback type block encryption, the encryption is performed without loosing the security of the encryption inherent to the feedback type.

I claim:

1. An encryption apparatus comprising:
    an input buffer for storing a plain text block sequence consisting of a plurality of multi-bit plain text blocks;
    an output buffer for storing an encryption text block sequence corresponding to the plain text block sequence of said input buffer;
    a mask register for storing information indicating whether the plain text blocks stored in said input buffer are to be encrypted or not to be encrypted;
    an encryption processor for encrypting plain text blocks stored in said input buffer;
    a read/write control circuit for sequentially reading the plain text blocks to be encrypted from said input buffer based on the information stored in said mask register, supplying the read plain text blocks to said encryption processor, storing encrypted text blocks at predetermined positions of said output buffer, sequentially reading the plain text blocks not to be encrypted from said input buffer, and storing the read plain text blocks at predetermined positions of said output buffer without supplying them to said encryption processor.

2. An encryption apparatus according to claim 1 wherein said encryption processor is in a cipher block chaining mode.

3. An encryption apparatus according to claim 2 wherein said cipher blocks chaining mode is one with an initial vector register.

4. An encryption apparatus according to claim 2 wherein the plain text block sequence consists of eight blocks.

5. An encryption apparatus comprising:
    an input buffer for storing a plain text block sequence consisting of a plurality of multi-bit plain text blocks;
    an output buffer for storing an encryption text block sequence corresponding to the plain text block sequence of said input buffer;
    a mask register for storing information indicating whether the plain text blocks stored in said input buffer are to be encrypted or not to be encrypted;
    an encrypted processor encrypting plain text blocks stored in said input buffer;
    a read/write control circuit for sequentially reading the plain text blocks from said input buffer, determining whether the read plain text blocks are to be encrypted or not based on the information stored in said mask register, supplying the plain text blocks to be encrypted to said encryption processor, storing the encrypted text blocks at predetermined positions of said output buffer, and storing the plain text blocks not to be encrypted at predetermined positions of the output buffer without supplying them to said encryption processor.

6. An encryption apparatus according to claim 4 wherein said encryption processor is in a cipher block chaining mode with an initial vector register.

* * * * *